United States Patent
Kim et al.

(10) Patent No.: US 10,374,682 B2
(45) Date of Patent: Aug. 6, 2019

(54) METHOD AND DEVICE FOR REMOVING SELF-INTERFERENCE IN WIRELESS ACCESS SYSTEM SUPPORTING FULL DUPLEX RADIO SCHEME

(71) Applicant: LG ELECTRONICS INC., Seoul (KR)

(72) Inventors: Jinmin Kim, Seoul (KR); Genebeck Hahn, Seoul (KR); Kwangseok Noh, Seoul (KR); Kukheon Choi, Seoul (KR); Jaehoon Chung, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 15/304,393

(22) PCT Filed: Apr. 17, 2014

(86) PCT No.: PCT/KR2014/003361
§ 371 (c)(1),
(2) Date: Oct. 14, 2016

(87) PCT Pub. No.: WO2015/160009
PCT Pub. Date: Oct. 22, 2015

(65) Prior Publication Data
US 2017/0041060 A1 Feb. 9, 2017

(51) Int. Cl.
*H04W 4/00* (2018.01)
*H04B 7/06* (2006.01)
(Continued)

(52) U.S. Cl.
CPC .............. *H04B 7/0686* (2013.01); *H04B 1/54* (2013.01); *H04B 1/56* (2013.01); *H04B 15/02* (2013.01); *H04L 5/14* (2013.01); *H04L 5/1461* (2013.01)

(58) Field of Classification Search
CPC .................................................. H04B 7/0686
See application file for complete search history.

(56) References Cited

U.S. PATENT DOCUMENTS

| | | | |
|---|---|---|---|
| 2008/0049862 A1* | 2/2008 | Dean | H04B 7/04 375/267 |
| 2010/0183052 A1* | 7/2010 | Geon | H04B 1/7115 375/146 |

(Continued)

FOREIGN PATENT DOCUMENTS

| KR | 10-2011-0110733 A | 10/2011 |
|---|---|---|
| KR | 10-1276740 B1 | 6/2013 |
| KR | 10-1318297 B1 | 10/2013 |

OTHER PUBLICATIONS

LG-Nortel, "Self-Interference: Measurement and Cancellation," 3GPP TSG RAN1 #57, R1-092185, San Francisco, USA, May 4-8, 2009, 3 pages.

*Primary Examiner* — Gerald A Smarth
(74) *Attorney, Agent, or Firm* — Birch, Stewart, Kolasch & Birch, LLP

(57) ABSTRACT

The present invention provides a method for removing a self-interference in a wireless access system supporting a full duplex radio (FDR) scheme, and devices for supporting the same. A method by which a transmission end removes self-interference in a wireless access system supporting an FDR scheme, according to one embodiment of the present invention, can comprise the steps of: transmitting two transmission signals by using two transmission antennas; receiving two reception signals by using two reception antennas; estimating a self-interference channel; and removing interference signals by considering the self-interference channel estimated from the reception signals. Here, the interference signals are the transmission signals which are inputted to the two reception antennas, the transmission signals and the (Continued)

reception signals are simultaneously transmitted and received through a resource region comprising the same time and frequency, and the two transmission antennas and the two reception antennas can be disposed on the transmission end in a diamond shape.

4 Claims, 18 Drawing Sheets

(51) Int. Cl.
*H04B 15/02* (2006.01)
*H04B 1/56* (2006.01)
*H04L 5/14* (2006.01)
*H04B 1/54* (2006.01)

(56) References Cited

U.S. PATENT DOCUMENTS

| | | | |
|---|---|---|---|
| 2010/0214964 A1* | 8/2010 | Larsson | H01Q 3/2605 370/277 |
| 2012/0147790 A1* | 6/2012 | Khojastepour | H01Q 3/2605 370/277 |
| 2012/0201173 A1* | 8/2012 | Jain | H04B 1/525 370/277 |
| 2013/0089009 A1 | 4/2013 | Li et al. | |
| 2013/0301487 A1* | 11/2013 | Khandani | H04W 16/14 370/278 |
| 2014/0218240 A1* | 8/2014 | Kpodzo | G01S 19/21 342/450 |
| 2014/0369255 A1* | 12/2014 | Lee | H04B 7/0417 370/315 |
| 2015/0311985 A1* | 10/2015 | Kim | H04B 15/00 455/501 |

* cited by examiner

Before ADC

After ADC

Digital interference cancellation and scaling

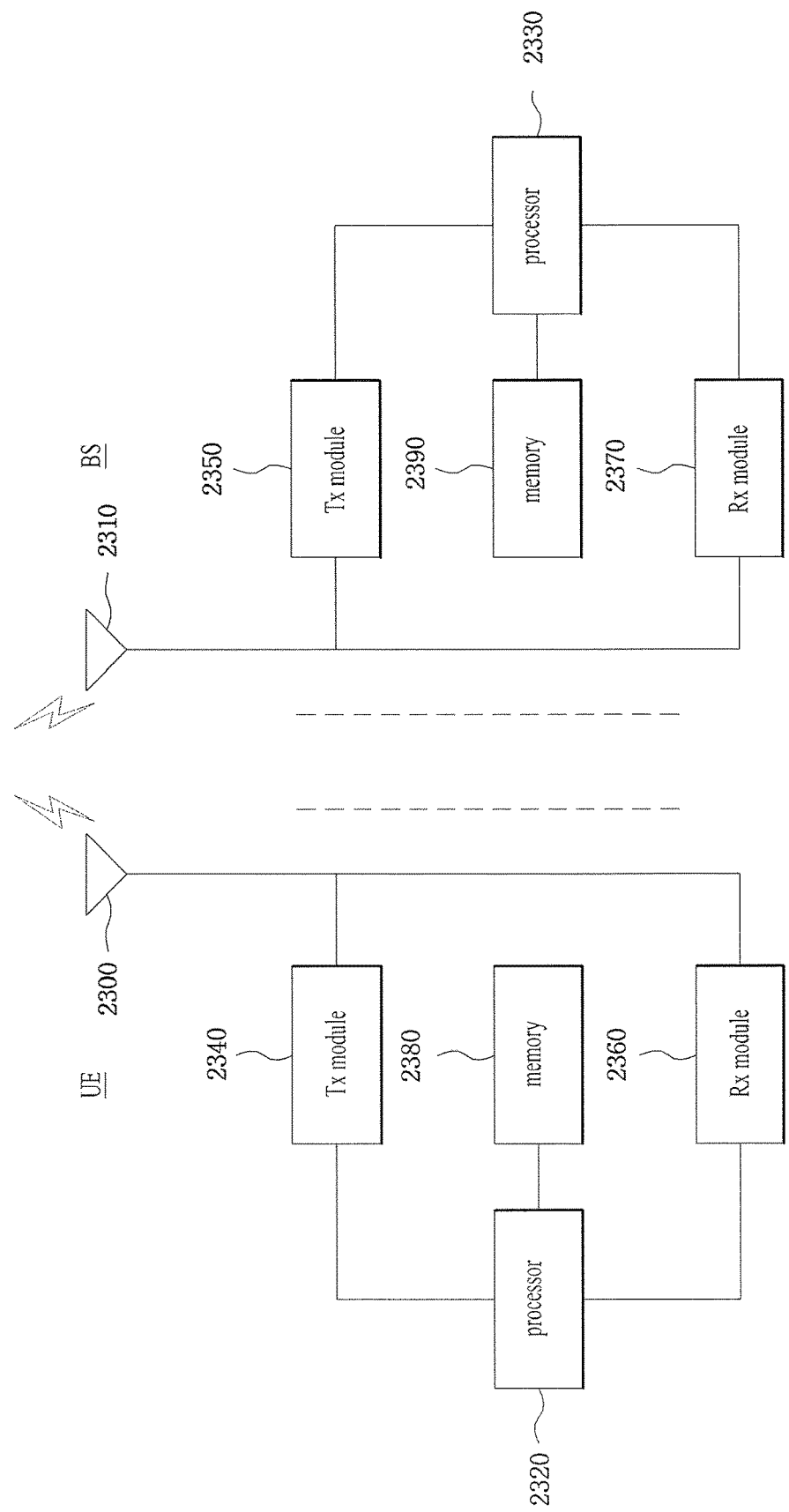

METHOD AND DEVICE FOR REMOVING SELF-INTERFERENCE IN WIRELESS ACCESS SYSTEM SUPPORTING FULL DUPLEX RADIO SCHEME

CROSS REFERENCE TO RELATED APPLICATION

This application is the National Phase of PCT International Application No. PCT/KR2014/003361 filed on Apr. 17, 2014. The entire contents of the above application are hereby incorporated by reference.

TECHNICAL FIELD

The present invention relates to a method of cancelling self-interference in a full duplex radio (FDR) system, which is one of wireless access systems, and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In particular, in the legacy wireless access systems, a base station or a user equipment performs communication using a half-duplex radio (HDR) scheme such as a frequency division duplex (FDD) scheme for dividing radio resources for signal transmission according to frequency or a time division duplex (TDD) scheme for diving the radio resources according to time.

However, according to the HDR communication scheme, the user equipment and/or the base station cannot simultaneously perform reception and transmission using the same frequency/time resource. Thus, introduction of the FDR communication scheme has been discussed to efficiently use resources. The FDR communication scheme allows the base station and/or the user equipment to simultaneously transmit and receive different signals on the same frequency/time resource region.

In a communication environment using the FDR scheme, since the base station and/or the user equipment simultaneously perform transmission and reception on the same resource region, self-interference, which means that a signal transmitted by a device is received at a reception antenna of the corresponding device, occurs. Hence, methods and apparatuses for cancelling such self-interference are required.

DISCLOSURE OF THE INVENTION

Technical Task

An object of the present invention is to provide a method for performing communication efficiently.

Another object of the present invention is to provide a method for cancelling self-interference in an FDR system.

Another object of the present invention is to provide a new antenna structure for cancelling self-interference.

Still another object of the present invention is to provide an antenna interference cancellation method for applying FDR to a MIMO system.

Further still another object of the present invention is to provide an apparatus for supporting the above-described methods.

It will be appreciated by persons skilled in the art that the objects that could be achieved with the present invention are not limited to what has been particularly described hereinabove and the above and other objects that the present invention could achieve will be more clearly understood from the following detailed description.

TECHNICAL SOLUTIONS

The present invention provides a method of cancelling self-interference in a wireless access system supporting a full duplex radio (FDR) scheme and apparatuses for supporting the same.

In a first technical aspect of the present invention, provided herein is a method of cancelling self-interference by a transmitting end in a wireless access system supporting a full duplex radio (FDR) scheme, including: transmitting two transmission signals using two transmission antennas; receiving two reception signals using two reception antennas; estimating a self-interference channel; and cancelling interference signals in consideration of the self-interference channel estimated from the reception signals. In this case, the interference signals may correspond to the transmission signals which are inputted to the two reception antennas, the transmission signals and the reception signals may be simultaneously transmitted and received through a resource region configured with the same time and frequency, and the two transmission antennas and the two reception antennas may be arranged at the transmitting end in a diamond shape.

In a second technical aspect of the present invention, provided herein is a transmitting end for cancelling self-interference in a wireless access system supporting a full duplex radio (FDR) scheme, including: two transmission antennas; two reception antennas; and a processor for cancelling the self-interference. In this case, the two transmission antennas may be configured to transmit two transmission signals, the two reception antennas may be configured to receive two reception signals, and the processor may be configured to estimate a self-interference channel and cancel interference signals in consideration of the self-interference channel estimated from the reception signals.

The interference signals may correspond to the transmission signals which are inputted to the two reception antennas, the transmission signals and the reception signals may be simultaneously transmitted and received through a resource region configured with the same time and frequency, and the two transmission antennas and the two reception antennas may be arranged at the transmitting end in a diamond shape.

The two transmission antennas may be arranged diagonally apart from each other in the diamond shape and the two reception antennas may also be arranged diagonally apart from each other in the diamond shape.

The two transmission antennas may further include a self-interference cancellation block for cancelling the self-interference.

The transmitting end may be a user equipment in the case of uplink or a base station in the case of downlink.

In a third technical aspect of the present invention, provided herein is a transmitter for cancelling self-interference in a wireless access system supporting a full duplex radio (FDR) scheme, including: n transmission antennas; n delays and attenuators; and m reception antennas. In this case, the n transmission antennas and the m reception antennas may be arranged apart by a constant interval at the transmitter, the n transmission antennas may be arranged adjacent to each other, and the m reception antennas may be arranged adjacent to each other. In addition, when signals transmitted from the n transmission antennas are received by the m reception antennas, the n delays and attenuators connected to the n transmission antennas may control the signals to have the same channel characteristics.

At this time, the n delays and attenuators may apply time delay and/or power attenuation to each of the signals transmitted from the n transmission antennas in consideration of an arrangement order of the n transmission antennas.

In addition, the transmitter may further include m delays and attenuators and the m delays and attenuators connected to the m reception antennas may apply time delay and/or power attenuation to the signals received from the n transmission antennas.

Moreover, it is preferable that the number of the transmission antennas is identical to the number of the reception antennas. For instance, the number of the antennas may be 2, 3, 4, or 8.

Furthermore, the delay and attenuator may use a digital pre-equalizer for converting a baseband signal.

The afore-described aspects of the present invention are merely a part of preferred embodiments of the present invention. Those skilled in the art will derive and understand various embodiments reflecting the technical features of the present invention from the following detailed description of the present invention.

ADVANTAGEOUS EFFECTS

According to the embodiments of the present invention, the following effects can be achieved.

First of all, communication can be reliably performed in the wireless access system supporting the FDR.

Secondly, reception performance of the FDR system can be improved by cancelling the self-interference.

Thirdly, since the new antenna structure for self-interference cancellation is used, the self-interference can be efficiently cancelled and hardware implementation complexity of a user equipment or a base station can also be reduced.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 23 illustrates apparatuses for implementing the methods described in FIGS. 1 to 22.

BEST MODE FOR INVENTION

Figure 1:
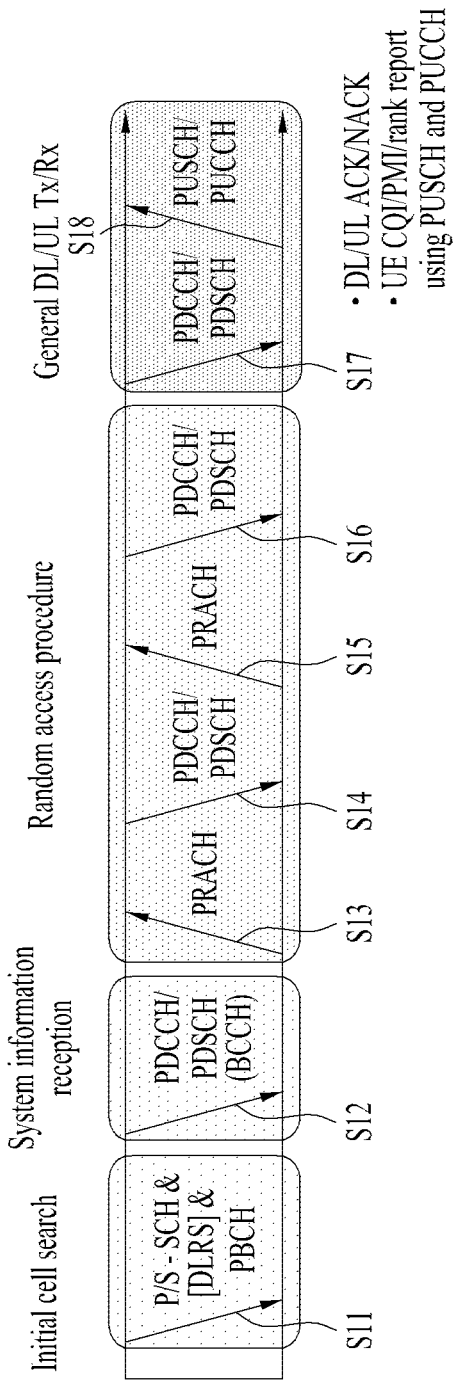
FIG. 1 illustrates physical channels and a general signal transmission method using the physical channels, which may be used in embodiments of the present invention.

The embodiments of the present invention, which will be described in detail below, relate to a method of cancelling self-interference in an FDR system and apparatuses for supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
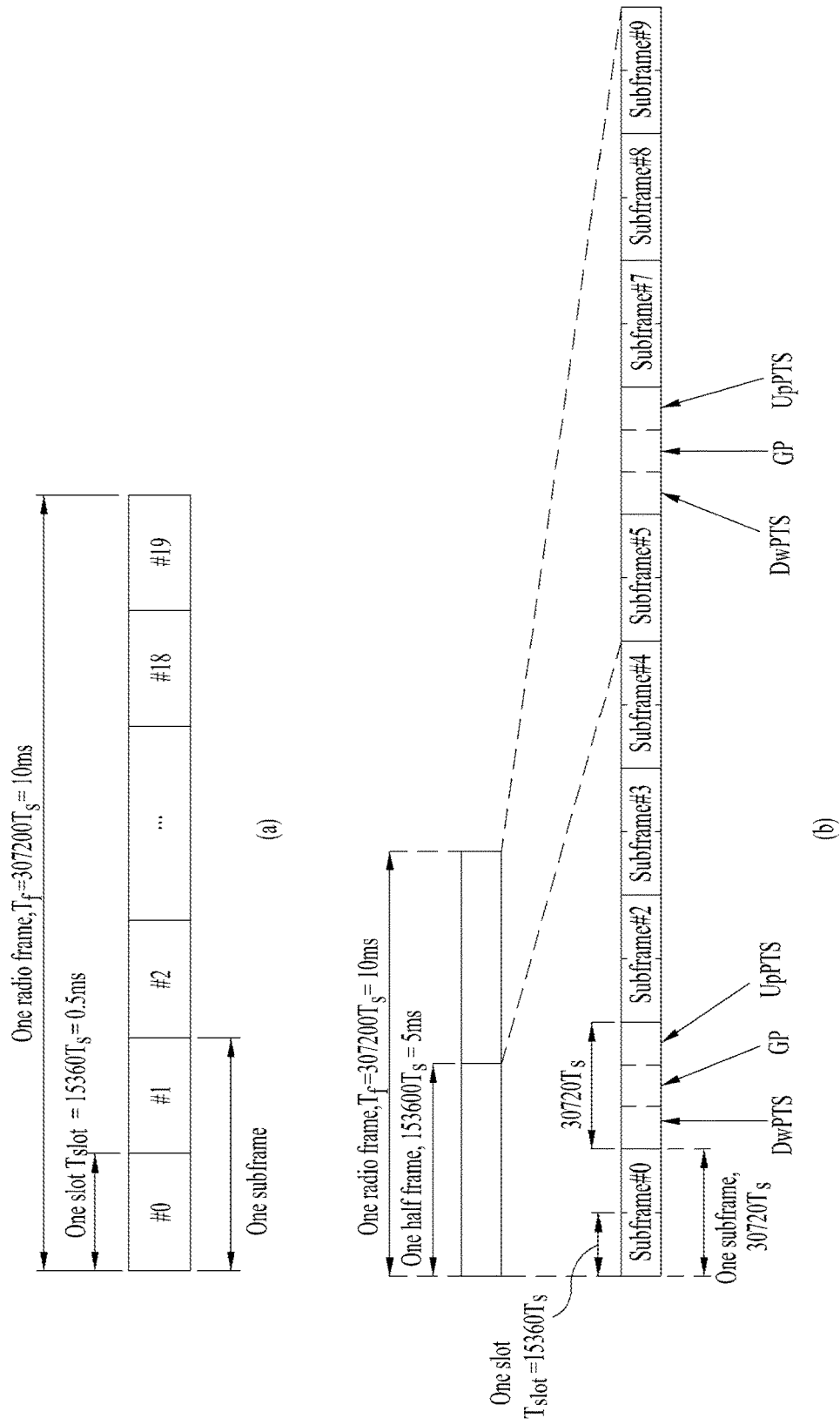
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot}=15360 \cdot T_s$). Ts is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

Figure 3:
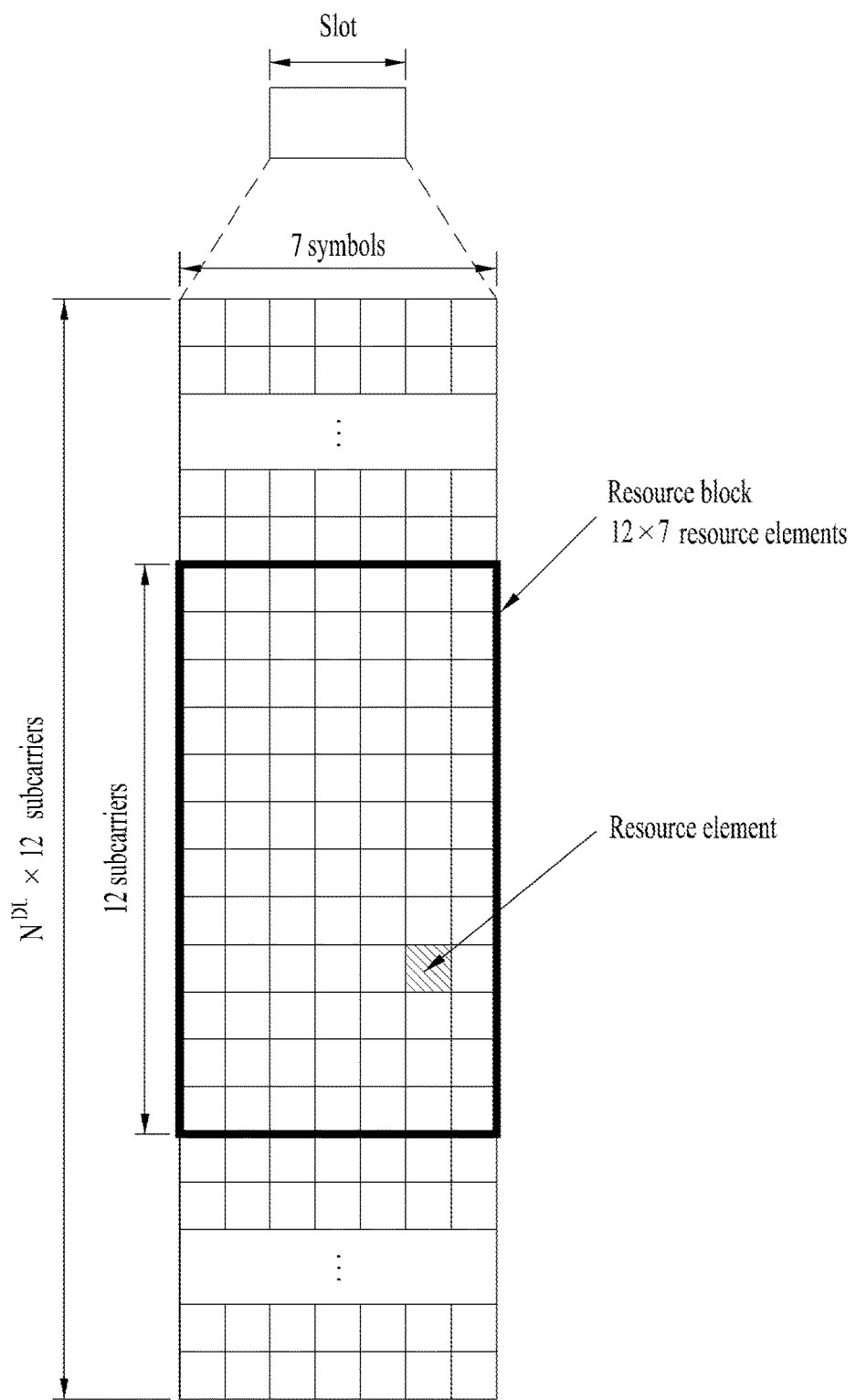
FIG. 3 illustrates a structure of a DownLink (DL) resource grid for the duration of one DL slot, which may be used in embodiments of the present invention.

In a full FDD system, each of 10 subframes may be used simultaneously for DL transmission and UL transmission FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
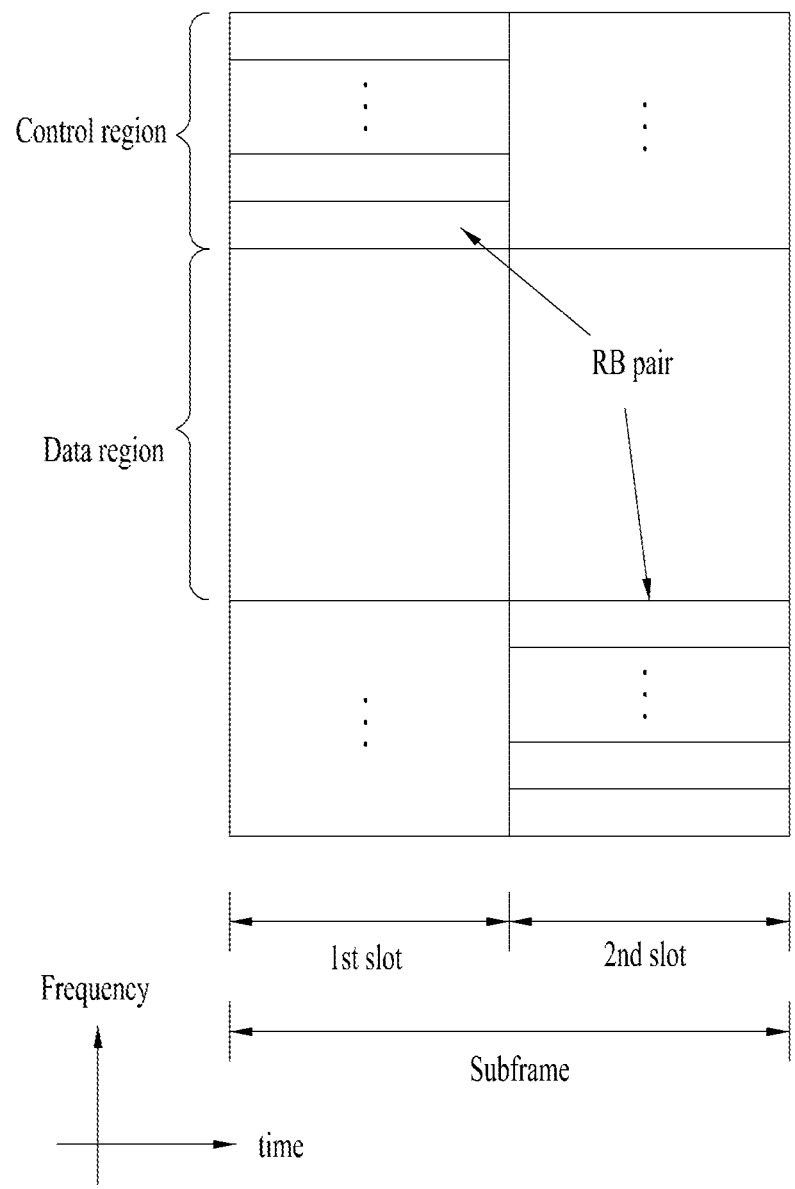
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
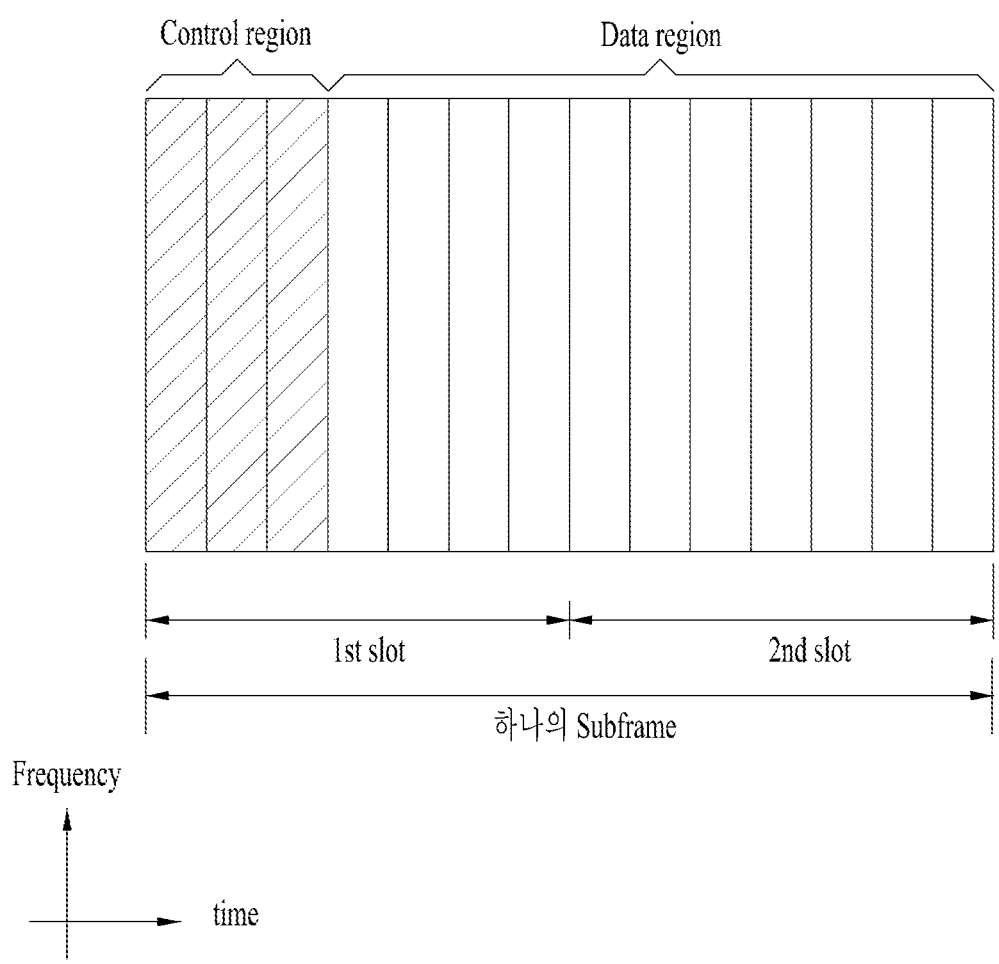
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
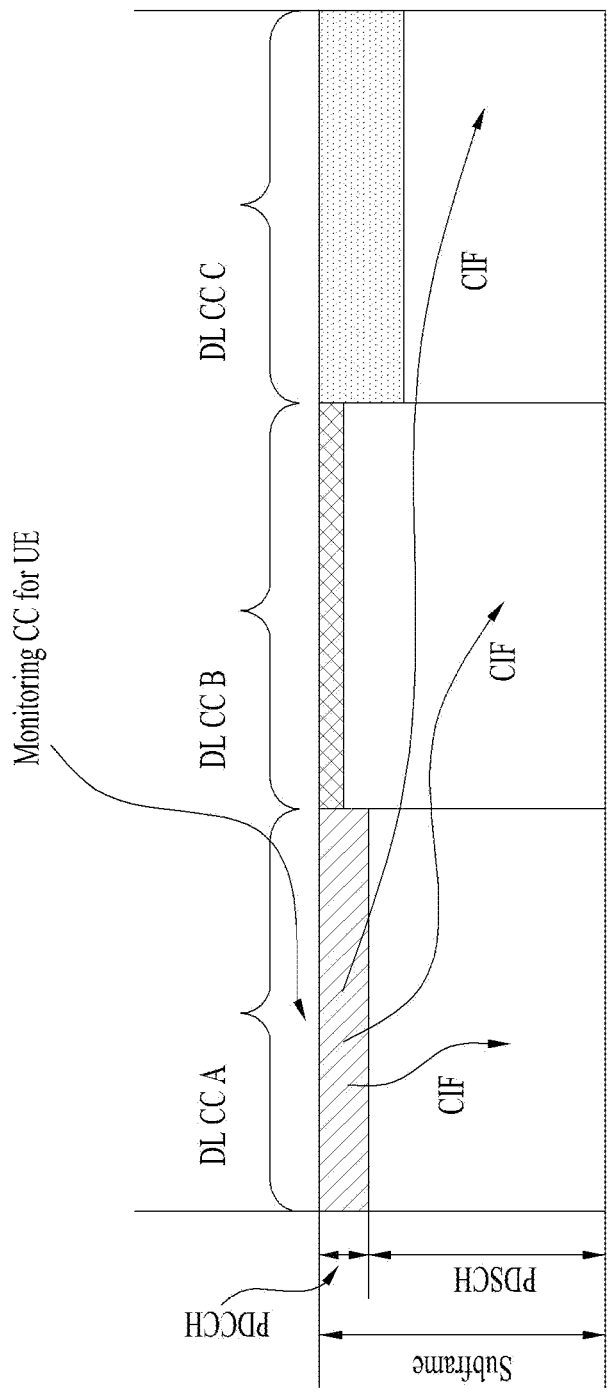
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. FDR System

An FDR system can be applied to the above-described LTE/LTE-A system.

That is, all of a frame structure, a control signal transmission and reception method, and a CA-supporting scheme, which are defined in the LTE/LTE-A system, may be applied to the FDR system. Hereinafter, an interference cancellation method in the FDR system will be described in detail.

3.1 Interference Cancellation in FDR System

The FDR system means a system for supporting simultaneous data transmission and reception through the same resource (i.e., the same time and the same frequency) at a single UE.

Figure 7:
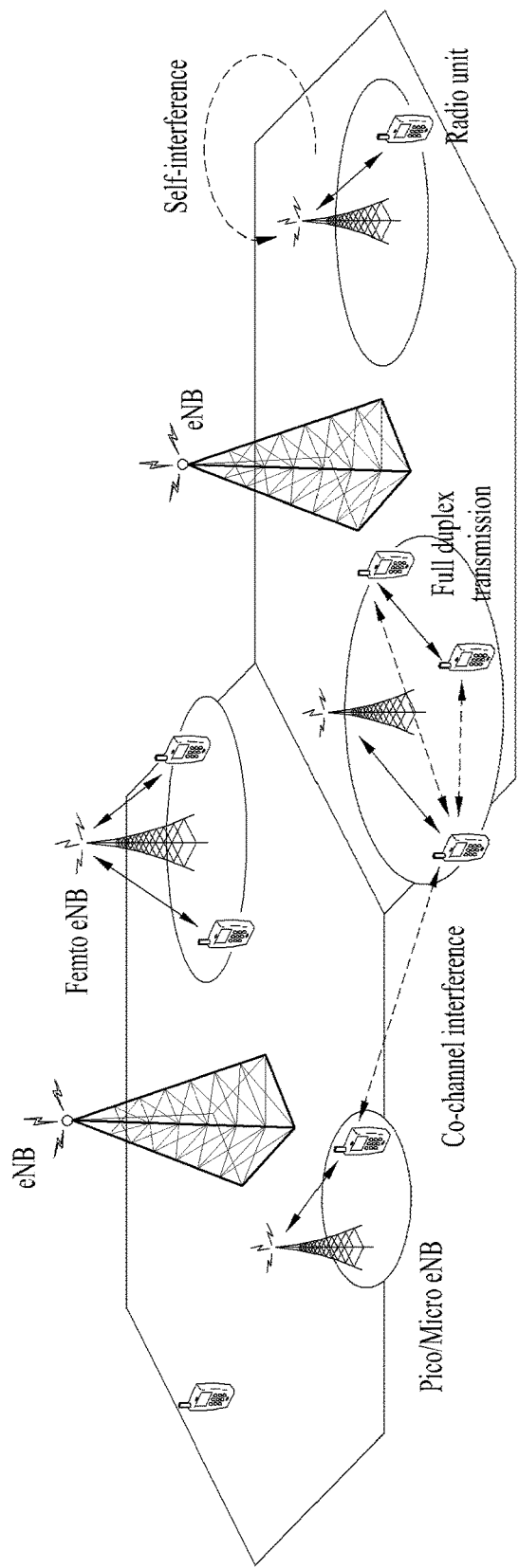
FIG. 7 is a diagram illustrating an example of deploying a wireless access system supporting FDR.

FIG. 7 is a diagram illustrating an example of deploying a wireless access system supporting FDR.

Referring to FIG. 7, a wireless access system supporting FDR includes a macro eNB managing a normal cell, a small eNB managing a small cell, and a UE (i.e., a wireless unit). In this case, the small eNB includes a micro eNB, a femto eNB, a pico eNB, and the like.

In a situation as illustrated in FIG. 7, there may be three types of interference described below.

(1) Intra-Device Interference (IDI)

IDI means that a signal transmitted from a transmission antenna of an eNB or a UE is received at a reception antenna of the eNB or the UE, thereby acting as interference due to characteristics of FDR. A signal transmitted from a transmission antenna of a specific device has higher power than a received signal. This is because, due to a short distance between the transmission antenna and a reception antenna of the specific device, the signal transmitted from the transmission antenna is received by the reception antenna almost without attenuation. Thus, the signal transmitted from the transmission antenna of the specific device is received at much higher power than a desired signal that the specific device expects to receive from a peer device.

(2) UE-to-UE Inter-Link Interference

UE-to-UE inter-link interference means that a UL signal transmitted from a specific UE is received by another UE adjacent to the specific UE, thereby acting as interference.

(3) BS-to-BS Inter-Link Interference

BS-to-BS inter-link interference means that a signal transmitted between eNBs or between heterogeneous eNBs in a HetNet situation is received by a reception antenna of another eNB, thereby acting as interference.

Among the above three types of interference, the intra-device interference (hereinafter, self-interference) is affected by interference generated only in the FDR and should be solved first for FDR management.

Figure 8:
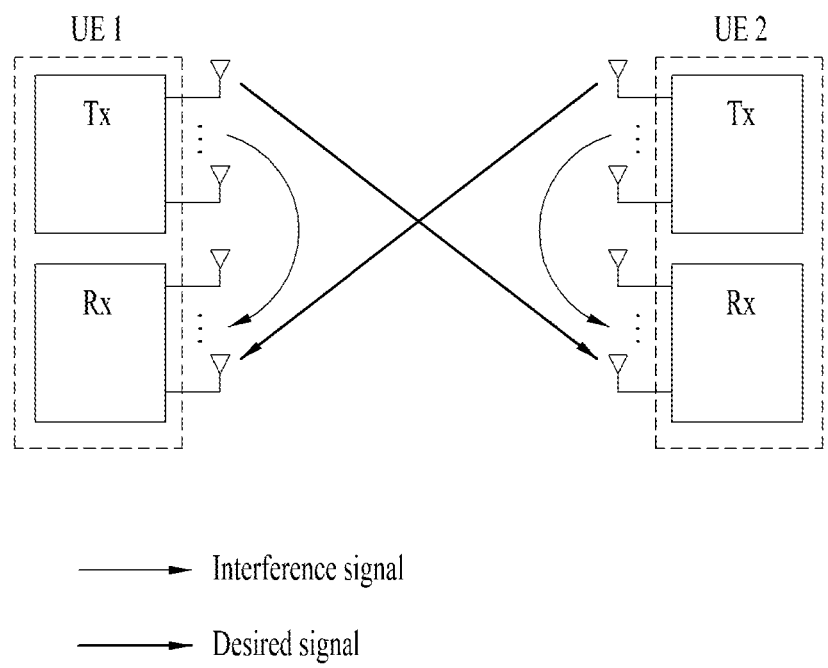
FIG. 8 is a diagram illustrating the concept of self-interference occurring in an FDR system.

FIG. 8 is a diagram illustrating the concept of self-interference occurring in an FDR system.

Although FIG. 8 illustrates data communication performed between UEs for convenience of description, the present invention is identically applicable to data communication performed between a UE and an eNB.

Referring to FIG. 8, in an FDR environment, a transmission signal transmitted from a transmission antenna of a first UE (i.e., UE1) to a second UE (i.e., UE2) is received by a reception antenna of the first UE, thereby acting as an interference signal. Such self-interference has the following unique characteristics as opposed to other interference.

First, the first UE may regard the signal acting as interference as a perfectly known signal because the self-interference signal received through the reception antenna of the first UE is the transmission signal transmitted by the first UE.

Second, power of the interference signal acting as the interference is remarkably higher than that of a desired signal that the first UE desires to receive because a distance between the transmission antenna and the reception antenna of the first UE is much shorter than a distance between the first UE and the second UE. Due to this characteristic, a receiver is unable to perfectly cancel an interference signal even though a UE is fully aware of the signal acting as interference.

A receiver of a UE may use an analog-to-digital converter (ADC) to convert a received signal into a digital signal. Generally, the ADC measures power of the received signal to adjust a power level of the received signal, quantizes the received signal, and converts the received signal into the digital signal. However, compared to a desired signal, an interference signal is received by the receiver at significantly high power. Thus, a signal characteristic of the desired signal is totally ignored by a quantization level during quantization and thus the receiver may be unable to restore the desired signal.

Figure 9:
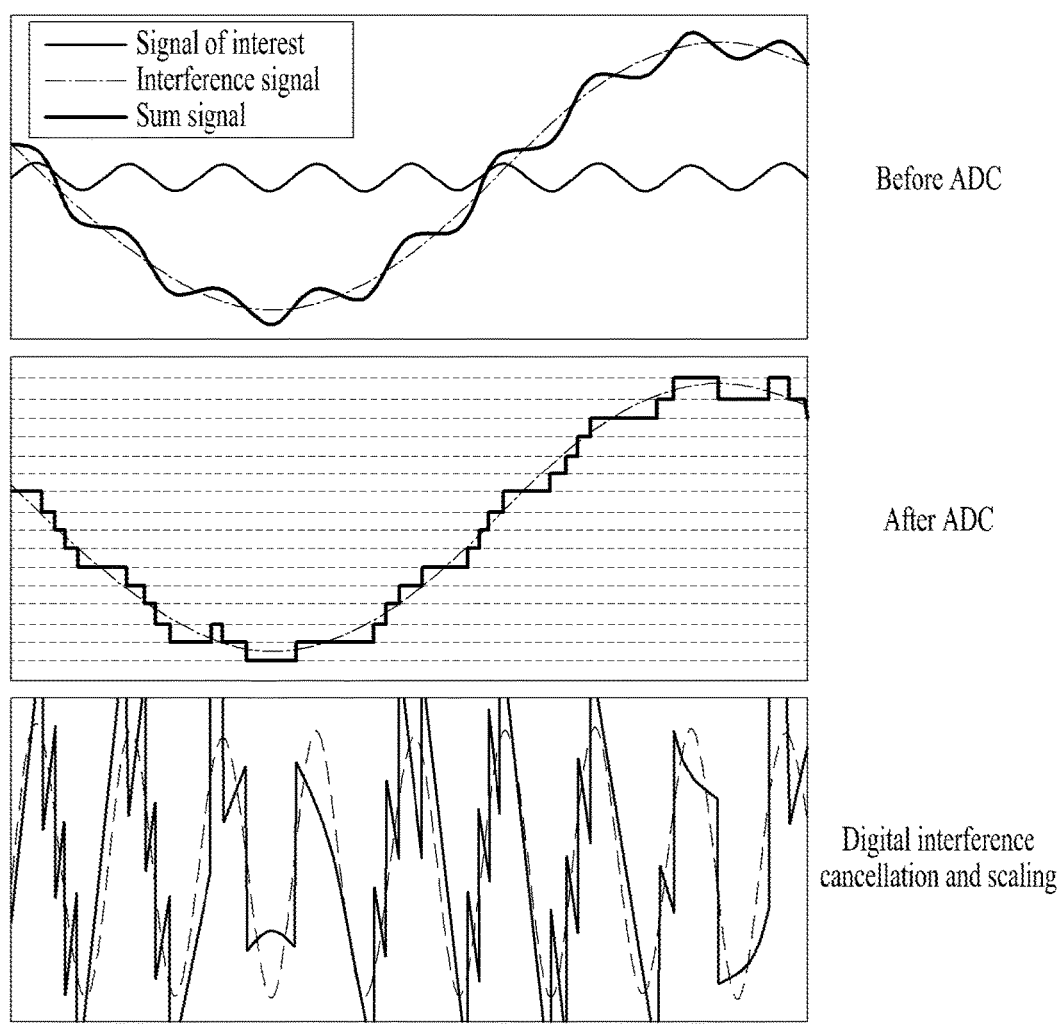
FIG. 9 is a diagram illustrating signal distortion caused by a quantization error when power of an interference signal is higher than power of a desired signal.
Figure 10:
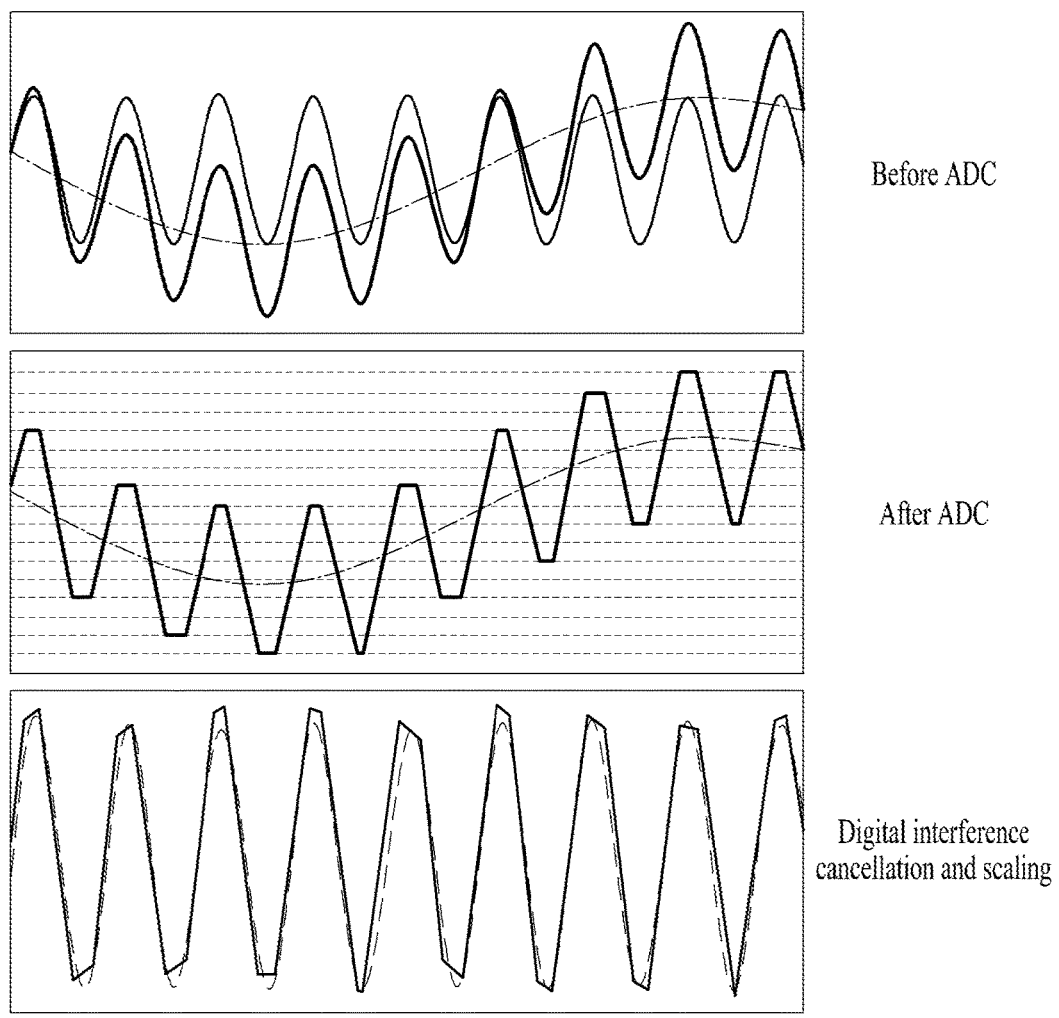
FIG. 10 is a diagram illustrating a signal restoration state when power of an interference signal is lower than power of a desired signal.

FIG. 9 is a diagram illustrating signal distortion caused by a quantization error when power of an interference signal is higher than power of a desired signal, whereas FIG. 10 is a diagram illustrating a signal restoration state when power of an interference signal is lower than power of a desired signal.

FIG. 9 shows that when 4-bit quantization is performed in a situation in which an interference signal has remarkably higher power than a desired signal, the desired signal is severely distorted even though the interference signal is cancelled. In contrast, FIG. 10 shows that when am interference signal has lower power than a desired signal, the desired signal is restored after cancellation of the interference signal.

Figure 11:
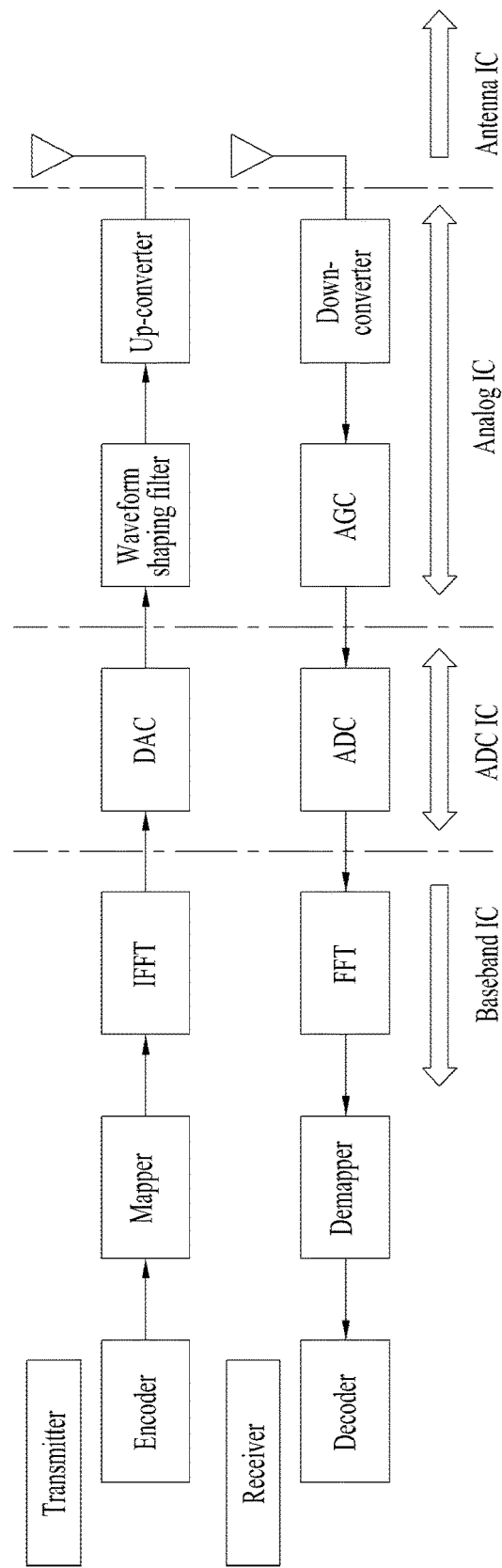
FIG. 11 is a block diagram of a transmitter and a receiver to which schemes for cancelling self-interference are applied.

FIG. 11 is a block diagram of a transmitter and a receiver to which schemes for cancelling self-interference are applied.

Referring to FIG. 11, the transmitter may include an encoder for coding a data bit, a mapper for mapping the encoded data bit to a physical resource, an inverse fast Fourier transform (IFFT) unit for converting the data bit into data using an OFDM scheme, a digital-to-analog converter (DAC) for modulating a digital signal into an analog signal, a waveform shaping filter for converting the modulated signal into a desired waveform, an up-converter for raising a frequency of a signal, and an antenna.

The receiver may include an antenna for receiving a signal, a down-converter for lowering a frequency of the received signal, an automatic gain controller (AGC) for automatically controlling an amplification factor so that output of a circuit becomes a predetermined range, an analog-to-digital converter (ADC) for modulating an analog signal into a digital signal, a fast Fourier transform (FFT) unit for converting an input signal into data of a frequency domain, a demapper and a decoder for decoding an output signal.

Referring to FIG. 11, antenna interference cancellation (IC) is performed in the antennas of the transmitter and the receiver and analog IC is performed in the waveform shaping filter and the up-converter of the transmitter and the AGC and the down-converter of the receiver. ADC IC is performed in the DAC of the transmitter and the ADC of the receiver and baseband IC (or digital IC) is performed in the other parts of the transmitter and the receiver.

Hereinafter, IC schemes performed by each part of the transmitter and the receiver will be described.

3.1.1 Antenna IC

Figure 12:
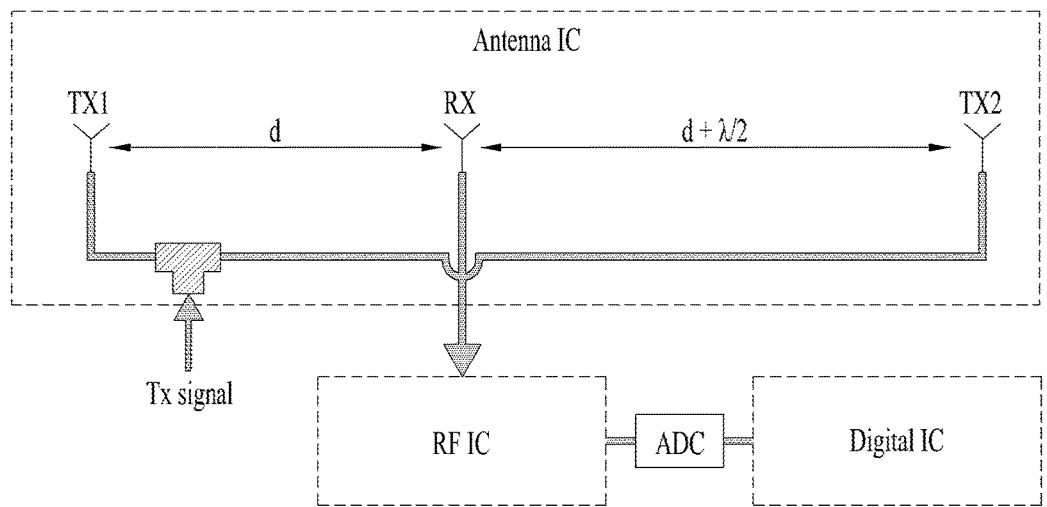
FIG. 12 is a diagram illustrating an exemplary antenna IC scheme using a distance between antennas.

Among all IC schemes, an antenna IC scheme could be implemented most simply. FIG. 12 is a diagram illustrating an exemplary antenna IC scheme using a distance between antennas and FIG. 13 is a diagram illustrating an exemplary antenna IC scheme using a phase shifter.

Referring to FIG. 12, one UE may perform IC using three antennas. In this case, two antennas are used as transmission antennas (Tx1 and Tx2) and one antenna is used as a reception antenna (Rx). The two transmission antennas are installed apart from each other by about a half wavelength (wavelength/2) with reference to the reception antenna. This allows a signal transmitted from each transmission antenna to be received as a phase-inverted signal at the reception antenna. Accordingly, an interference signal from among signals received by the reception antenna converges to zero.

Figure 13:
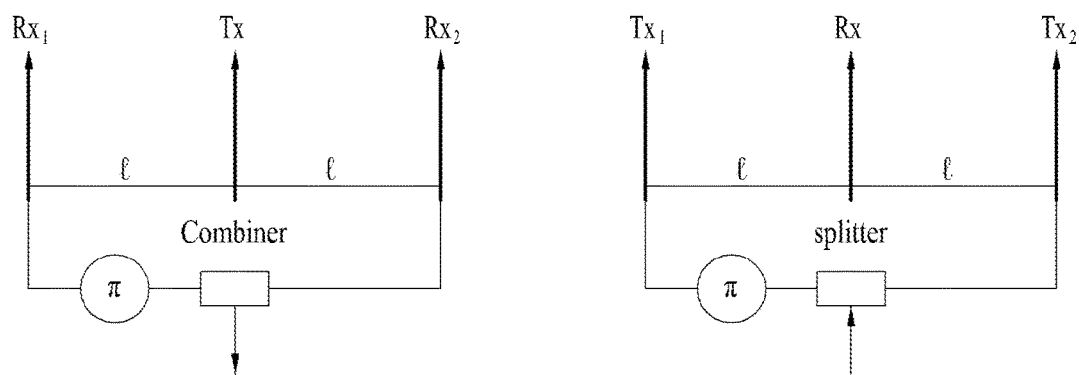
FIG. 13 is a diagram illustrating an exemplary antenna IC scheme using a phase shifter.

Referring to FIG. 13, an interference signal may be cancelled using a phase shifter for inverting a phase of a second transmission antenna (Tx2) in the same antenna configuration as in FIG. 12. The left drawing of FIG. 13 illustrates antenna deployment for cancelling self-interference using two reception antennas and the right drawing of FIG. 13 illustrates antenna deployment for cancelling interference using two transmission antennas.

Figure 14:
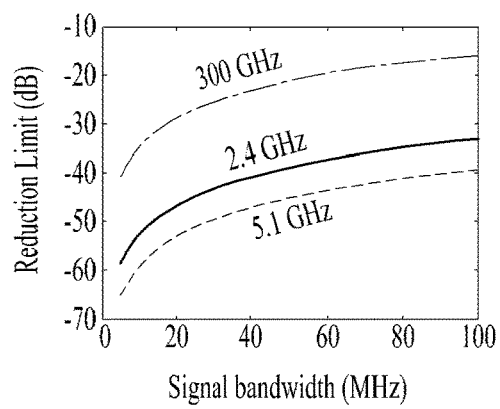
FIG. 14 illustrates IC performance according to bandwidth and center frequency of a signal when an antenna IC scheme is used.

The above antenna IC scheme is affected by bandwidth and center frequency of a transmission signal. That is, as the bandwidth of the transmission signal decreases and as the center frequency of the transmission signal increases, IC performance is enhanced. FIG. 14 illustrates IC performance according to bandwidth and center frequency of a signal when an antenna IC scheme is used.

3.1.2 ADC IC

Even though an interference signal is well known to a transmitter, the main factor that prevents interference cancellation is an ADC. That is, if performance of the ADC is maximized, interference can be cancelled. However, ADC IC has a difficulty in actual implementation due to limitation of quantization bits of the ADC. Since ADC performance has been gradually improved in recent times, required self-interference cancellation performance may be reduced.

3.1.3 Analog IC

Analog IC is a scheme of cancelling interference before the ADC and cancels self-interference using an analog signal. The analog IC may be performed in an RF domain or an IF domain. According to the analog IC scheme, an interference signal is subtracted from a signal received by a reception antenna in a manner of delaying phase and time of a transmitted analog signal.

Compared to the antenna IC method, the analog IC method has the following advantage: the number of required transmission antennas and the number of required reception antennas are one, respectively. However, in the case of the analog IC, since processing is performed using an analog signal, additional distortion may occur due to implementation complexity and circuit characteristics and thus IC performance may be remarkably changed.

3.1.4 Digital IC (Baseband IC)

Digital IC is a scheme for cancelling interference after ADC and includes all IC schemes performed in a baseband domain. The digital IC may be performed in a manner of subtracting a transmitted digital signal from a received digital signal.

Alternatively, a UE or an eNB that transmits a signal using multiple antennas may perform beamforming or precoding so that a transmission signal may not be received by a reception antenna. If such schemes are performed on a baseband, the schemes may be categorized as digital IC.

However, only when a digitally modulated signal is quantized such that information on a desired signal can be restored, the digital IC can be performed. In order to perform the digital IC, a magnitude difference in power between an interference signal and the desired signal should be within an ADC range after interference is cancelled using at least one of the IC schemes described in sections 3.1.1 to 3.1.3.

Figure 15:
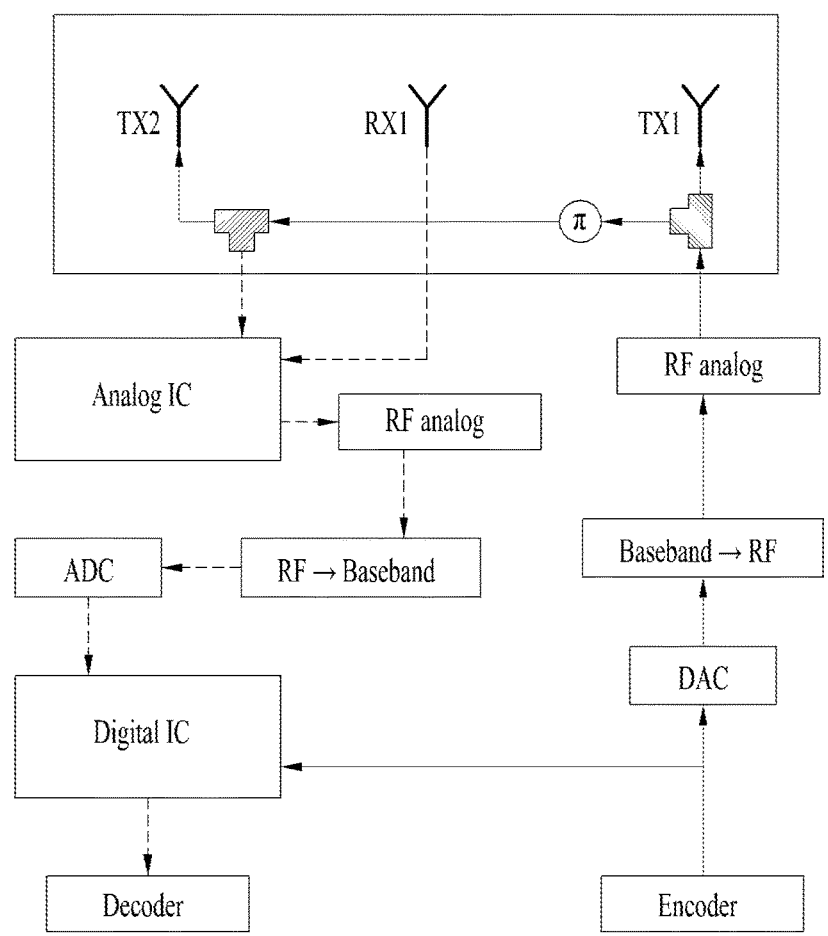
FIG. 15 illustrates a system to which various IC schemes are simultaneously applied.

FIG. 15 illustrates a system to which the IC schemes described in sections 3.1.1 to 3.1.4 are simultaneously applied. Overall IC performance may be improved as IC schemes performed on the respective domains are added.

3.2 IC in MIMO System

An FDR system has been considered in a single input single output (SISO) scheme because complexity of self-interference cancellation (SIC) remarkably increases in proportion to the number of reception antennas and the number of transmission antennas. For example, in order to introduce FDR in a MIMO system (Nt×Nr) using N transmission antennas (Nt) and N reception antennas (Nr), a signal generated from each of the transmission antennas should be independently cancelled by each of the reception antennas so that a total of (Nt×Nr) SIC blocks are required.

In this case, an SIC block may be an analog interference canceller for cancelling an analog signal or an RF signal or may be a digital interference canceller for cancelling a digital baseband signal. Alternatively, the SIC block may be an analog-digital interference canceller, which is a combination of the analog interference canceller and the digital interference canceller.

Accordingly, the number of SIC blocks in the MIMO system exponentially increases as the number of antennas increases.

Figure 16:
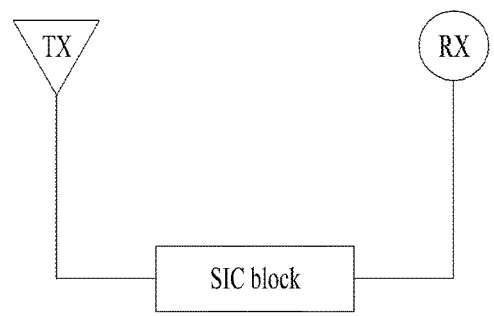
FIG. 16 is a diagram illustrating an exemplary antenna configuration for self-interference cancellation in a SISO system.
Figure 17:
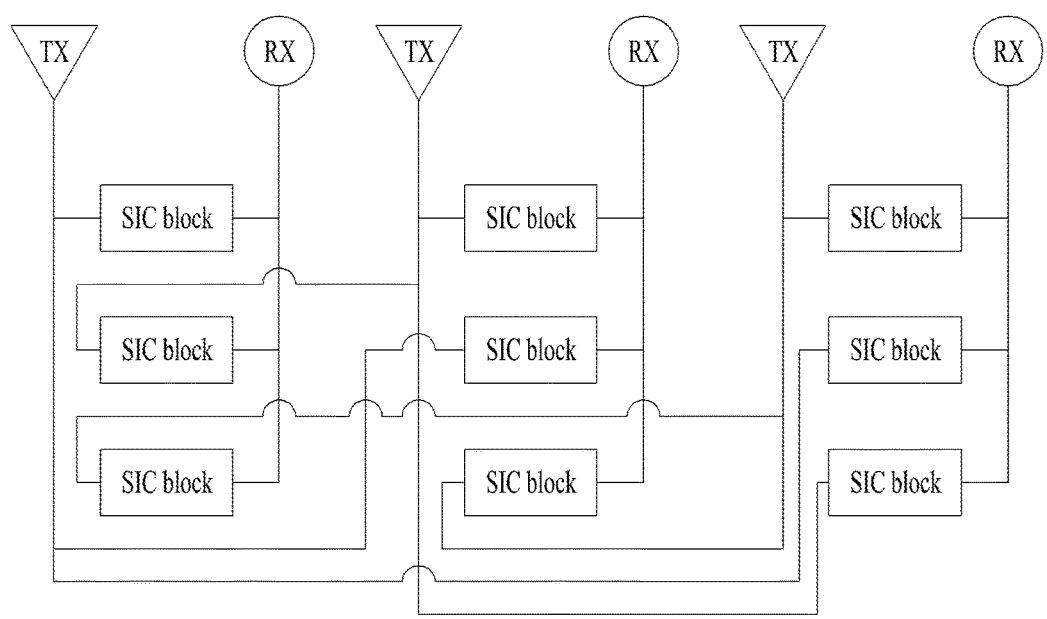
FIG. 17 is a diagram illustrating an exemplary antenna configuration for self-interference cancellation in a MIMO system.

For example, the conventional SISO system may cancel self-interference using one SIC block as shown in FIG. 16, whereas a 3×3 MIMO system requires a total of 9 SIC blocks to apply the FDR as shown in FIG. 17.

In this way, many SIC blocks are required to apply the FDR to the MIMO system, which may increase hardware complexity of a UE. In addition, since each SIC block should perform an adaptation procedure with respect to the UE, an adaptation time may increase or a training duration or signal necessary for performing the adaptation procedure may increase. Furthermore, UE performance may be degraded due to an inaccurate adaptation procedure.

Thus, antenna IC methods capable of not only reducing the hardware complexity but also applying the FDR to the MIMO system will be explained in the following description.

3.2.1 Antenna IC Method in MIMO System

Figure 18:
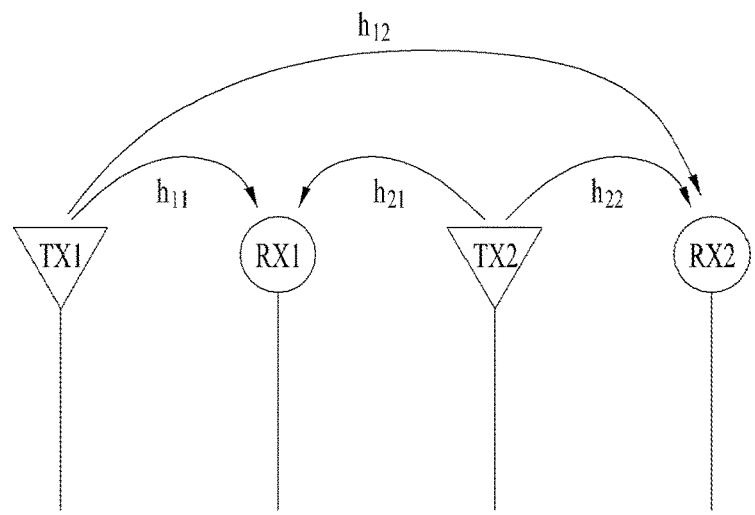
FIG. 18 is a diagram for explaining the concept of a self-interference channel created in a MIMO system to which FDR is applied.

FIG. 18 is a diagram for explaining the concept of a self-interference channel created in a MIMO system to which FDR is applied.

In FIG. 18, it is assumed that a UE has two transmission antennas and two reception antenna. In this case, a signal received by a first reception antenna (Rx1) of the UE is defined as $y_1$ and a signal received by a second reception antenna (Rx2) of the UE is defined as $y_2$. In addition, a signal transmitted by a first transmission antenna (Tx1) of the UE is defined as $x_1$ and a signal transmitted by a second transmission antenna (Tx2) of the UE is defined as $x_2$. Here, the reception signal and the transmission signal may be an analog signal or a digital signal according to whether an SIC block included in the corresponding UE or an eNB is an analog interference canceller or a digital interference canceller.

When the signal $x_1$ transmitted from the Tx1 of the UE and the signal $x_2$ transmitted from the Tx2 of the UE are respectively received by the Rx1 and Rx2 of the corresponding UE, the $x_1$ and $x_2$ act as interference signals. When the signal transmitted from the Tx1 of the UE is received by the Rx1, a created radio channel is defined as $h_{11}$. When the same signal is received by the Rx2, a created radio channel is defined as $h_{12}$. When the signal transmitted from the Tx2 of the UE is received by the Rx1, a created radio channel is defined as $h_{21}$. When the same signal is received by the Rx2, a created radio channel is defined as $h_{22}$. Although an antenna configuration or pattern of FIG. 18 is assumed to be ULA (uniform linear array), the above-described definitions can be identically applied to other antenna configurations or patterns.

In addition, from the perspective of the UE, a signal transmitted from another UE or the eNB is assumed to be a desired signal for the corresponding UE. In this case, it is assumed that the corresponding desired signal is transmitted through two antennas, they are defined as $d_1$ and $d_2$, respectively. Further, radio channels which the desired signal goes through are defined as $h_{11}$, $h_{12}$, $h_{21}$, and $h_{22}$, respectively.

Based on the above-mentioned assumptions, the signal received by the first reception antenna, $y_1$ and the signal received by the second reception antenna, $y_2$ can be expressed as shown in Equation 1.

$$y_1 = \underbrace{\frac{h_{11}x_1 + h_{21}x_2}{(a)}}_{} + \underbrace{\frac{h_{d11}d_1 + h_{d21}d_2}{(b)}}_{} + \underbrace{\frac{n_1}{(c)}}_{}$$
$$y_2 = \frac{h_{12}x_1 + h_{22}x_2}{(a)} + \frac{h_{d12}d_1 + h_{d22}d_2}{(b)} + \frac{n_2}{(c)}$$

[Equation 1]

In Equation 1, (a) indicates a self-interference signal, (b) indicates the desired signal which the UE should receive, and (c) indicates a reception noise. According to Equation 1, the number of SIC blocks necessary for SIC at the UE is four. In addition, a target which needs to be cancelled is the self-interference signal, (a). Thus, in the embodiments of the present invention, the desired signal can be simply expressed as shown in Equation 2 for convenience of description.

$$y_1 = \underline{h_{11}}x_1 + \underline{h_{21}}x_2 + \underline{D_1} + \underline{n_1}$$

$$y_2 = \underline{h_{12}}x_1 + \underline{h_{22}}x_2 + \underline{D_2} + \underline{n_2} \quad \text{[Equation 2]}$$

In Equation 2, the interference channels $h_{11}$ and $h_{21}$ can be assumed to be very similar to each other and the interference channels $h_{12}$ and $h_{22}$ can be assumed to be very similar to each other. The reason for the assumption is that since a maximum distance between transmission antennas and reception antennas included in a single UE is in the range of 10 cm to 1 m, the transmission antennas and reception antennas are in a very similar channel environment. Therefore, Equation 2 can be expressed as Equation 3 by assuming $h_1 = h_{11} = h_{21}$ and $h_2 = h_{12} = h_{22}$.

$$y_1 = \underline{h_1(x_1+x_2)} + \underline{D_1} + \underline{n_1}$$

$$y_2 = \underline{h_2(x_1+x_2)} + \underline{D_2} + \underline{n_2} \quad \text{[Equation 3]}$$

When the received signals are defined as shown in Equation 3, the number of the SIC block required by the UE is reduced as two. In other words, all or some of the interference channels can be set equal to each other in a manner of adjusting characteristics of the self-interference channels. Hence, the number of the SIC blocks required by the UE can be reduced and a hardware configuration of the UE can become simple as well.

Although the description is mainly focused on a UE, it can be identically applied to an eNB.

3.3 Antenna Configuration Method

To satisfy the above-mentioned assumption of $h_1 = h_{11} = h_{21}$ and $h_2 = h_{12} = h_{22}$, when signals outputted from a transmission antenna are inputted to each reception antenna, the signals should have the same channel characteristics. To this end, antennas may be previously provided to a UE so that interference signals have the same channel characteristics and a pre-equalizer may be configured using a delay and an attenuator.

Figure 19:
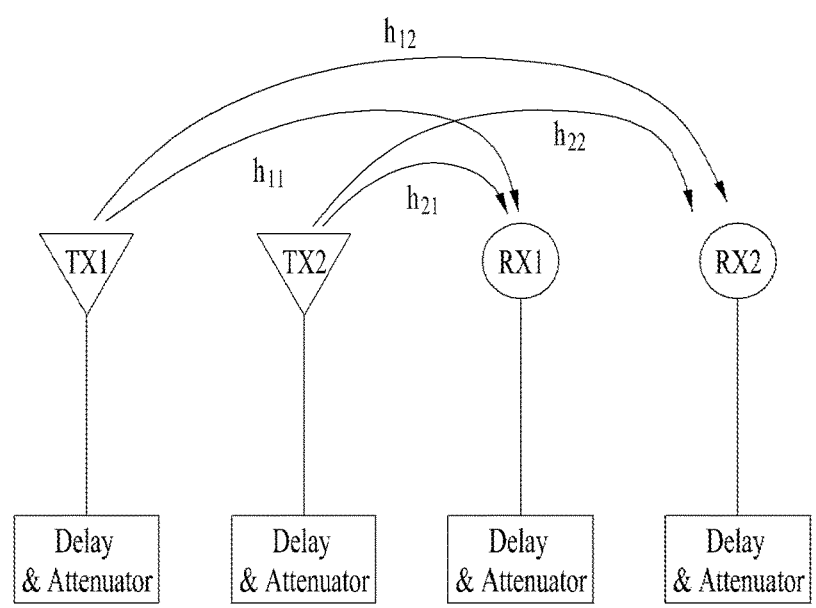
FIG. 19 illustrates one of methods for adjusting characteristics of a self-interference channel using antenna deployment, delays, and attenuators in a ULA condition.

FIG. 19 illustrates one of methods for adjusting characteristics of a self-interference channel using antenna deployment, delays, and attenuators in a ULA condition.

A UE and/or an eNB may be provided with n transmission antennas and m reception antennas. However, for convenience of description, assume that the UE or the eNB is provided with two transmission antennas and two reception antennas and a distance from between the two antennas is the same. In this case, when a signal transmitted from Tx1 is received by Rx1 and Rx2, delay and attenuator devices of the Tx 1 may be used to allow the signal transmitted from the Tx1 to have the same channel as a signal transmitted from Tx2.

In this case, channel characteristics of interference channels carrying the interference signals may be set equal to each other by proving the delay and attenuator device to the transmission antennas (Tx1 and Tx2) only. However, for the purpose of increasing degree of freedom of signals transmitted received by respective antennas, the delay and attenuator may be provided to reception antennas as shown in FIG. 19.

For example, assume that a propagation delay between antennas is 0.1 ms and a transmission power difference between the antennas is 1 dB. In this case, when $x_2$ is transmitted from the Tx2, the delay and attenuator of the Tx1 may decrease transmission power by 1 dB and add a delay of 0.1 ms. In this case, a radio channel $h_{21}$ that the $x_2$ goes through may become similar to a radio channel $h_{11}$ that $x_1$ goes through when the $x_1$ is transmitted from the Tx1.

In FIG. 19, regarding operation locations of the delay and attenuator, not only an analog device may be used to directly convert an RF signal but also a digital pre-equalizer may be used to convert a baseband signal.

Figure 20:
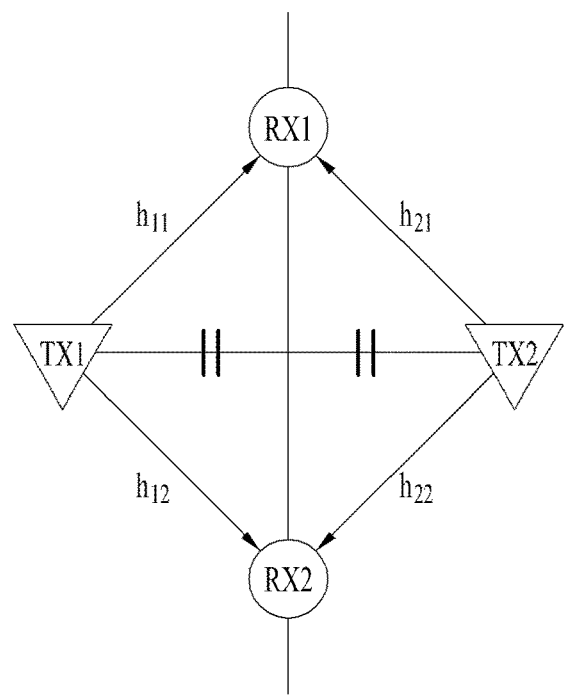
FIG. 20 illustrates one of methods for adjusting characteristics of a self-interference channel by deploying antennas in two dimensions.

FIG. 20 illustrates one of methods for adjusting characteristics of a self-interference channel by deploying antennas in two dimensions If antennas are accurately deployed in a specific UE or an eNB, delay and attenuator device may not be required unlike FIG. 19. In other words, all or a part of the characteristics of self-interference channels are set equal to each other by using the two-dimensional antenna array structure as shown in FIG. 20.

As a method for generalizing the antenna configuration method illustrated in FIG. 20, it may be considered that reception antennas (i.e., Rx1 and Rx2) are deployed at locations where channel characteristics from antennas Tx1 and Tx2 are allowed to be identical to each other. The simplest pattern for implementing the above method is to deploy the Rx1 and Rx2 at intermediate positions between the antennas Tx1 and Tx2.

Referring to FIG. 20, a vertical line is located at the middle between the Tx1 and Tx2. In this case, if the respective reception antennas are located on the line, the relations of $h_{11} = h_{21}$ and $h_{12} = h_{22}$ can be established. In addition, if the two reception antennas are located at the same distance from the center point, all channels can have the same characteristics. Hence, interference channels are defined as $h = h_1 = h_{21} = h_{12} = h_{22}$ and Equation 3 can be expressed as Equation 4 below.

$$y_1 = \underline{h(x_1+x_2)} + \underline{D_1} + \underline{n_1}$$

$$y_2 = \underline{h(x_1+x_2)} + \underline{D_2} + \underline{n_2} \quad \text{[Equation 4]}$$

Accordingly, it is preferable that an antenna pattern is a diamond shape or a square shape to allow all interference channels to have the same characteristics.

When antennas are configured in the form illustrated in FIG. 19 and FIG. 20, all or some of self-interference channels can be set equal to each other. That is, it is possible to use only two SIC blocks in a 2×2 MIMO environment. In other words, since the self-interference signals, which are received by the respective reception antennas, go through the same channel, the interference signals can be cancelled by performing interference cancellation only one time. This can be expressed as Equation 5 below.

$$\tilde{y}_1 = y_1 - \hat{h}_1(x_1+x_2) = \underline{h_1(x_1+x_2)} + \underline{D_1} + \underline{n_1} - \hat{h}_1(x_1+x_2)$$

$$\tilde{y}_2 = y_2 - \hat{h}_2(x_1+x_2) = \underline{h_2(x_1+x_2)} + \underline{D_2} + \underline{n_2} - \hat{h}_2(x_1+x_2) \quad \text{[Equation 5]}$$

In Equation 5, $\hat{h}_1$, $\hat{h}_2$ indicates estimated self-interference channels. To estimate the self-interference channels, orthogonal pilot or reference signals, which are divided according to time, frequency, or code, may be used. Thus, the reception antenna may estimate the channels by separating the channels, which the self-interference signals transmitted from the respective transmission antennas go through, based on the orthogonal characteristics.

Figure 21:
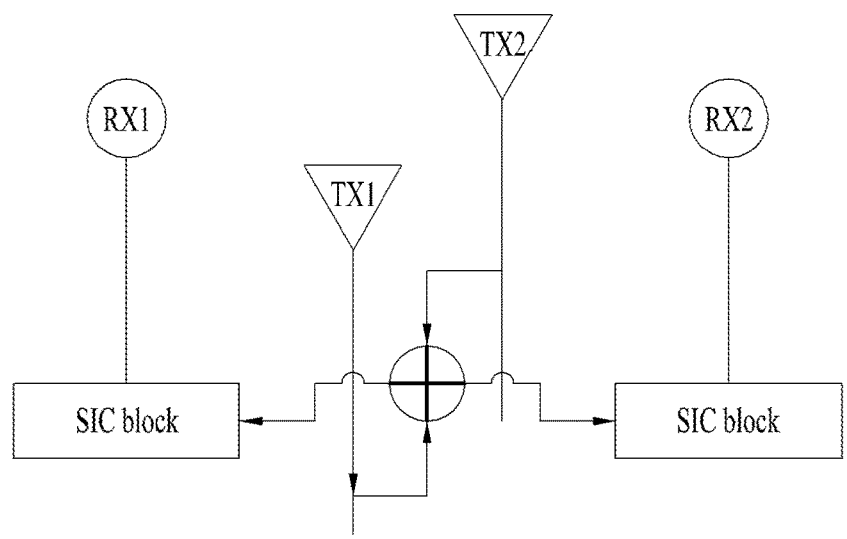
FIG. 21 is a conceptual diagram for explaining antenna deployment based on the methods described in FIGS. 19 and 20.

FIG. 21 is a conceptual diagram for explaining antenna deployment, which is implemented according to the methods described in FIGS. 19 and 20.

As shown in FIG. 21, a block for combining signals transmitted from transmission antennas is necessary to implement the embodiments of the present invention. Although a device type for implementing the combining block is mentioned in the present invention, all analog devices capable of combining interference signals can be used for the combining block.

According to the embodiments of the present invention, the number of SIC blocks required by an 2×2 MIMO system is not four but corresponds to the number of reception antennas. In other words, self-interference may be cancelled using only two SIC blocks. Accordingly, hardware configuration complexity is decreased.

In addition, in the case of a scheme that uses the antenna pattern described in FIG. 20 only, regarding the service environment, the number of transmission antennas is limited to two but the number of reception antennas is not limited. Moreover, if antennas are arranged in three dimensions, it is also possible to use more than two transmission antennas. Furthermore, if the delay and attenuator described in FIG. 19 are simultaneously used for the implementation, the FDR system can be established using more than two transmission antennas. In other words, although the 2×2 MIMO system is illustrated in FIG. 21, the present invention can be extensively applied to a n×n MIMO system by combining the methods described in FIG. 19 and FIG. 20.

According to the methods proposed in the embodiments of the present invention, when the FDR is applied to the MIMO system, the number of SIC blocks required for cancelling the self-interference is not proportional to the number of transmission antennas and reception antennas but corresponds to only the number of the reception antennas.

To this end, all or some of the self-interference channels are set equal to each other by using the above-mentioned deployment of transmission antennas and reception antennas and the delay and attenuator devices, and signals outputted from the transmission antennas are inputted to the SIC blocks, whereby interference signals can be cancelled from reception signals.

Figure 22:
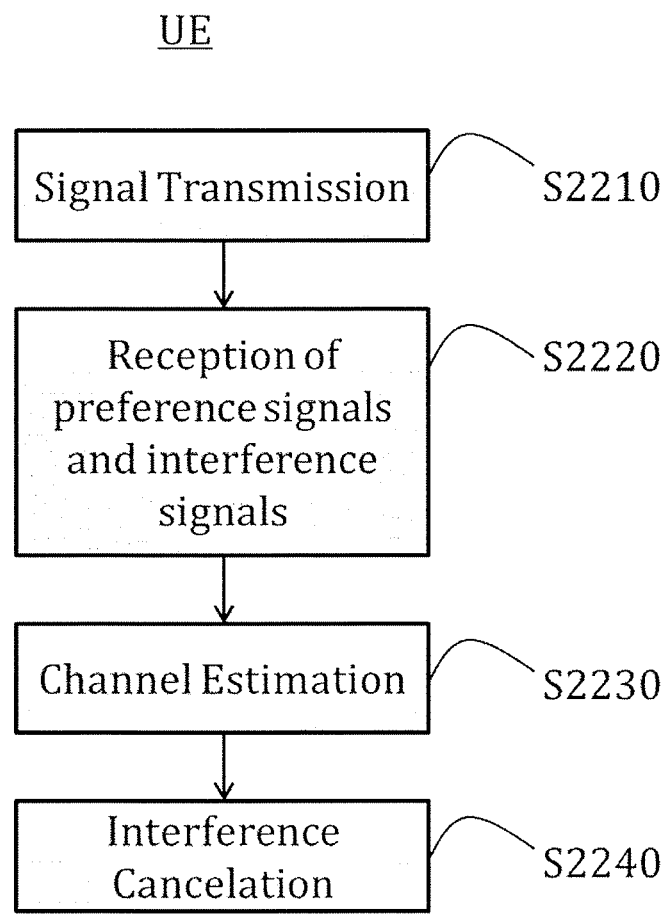
FIG. 22 is a diagram for explaining one of methods for cancelling a self-interference signal in an FDR system.

FIG. 22 is a diagram for explaining one of methods for cancelling a self-interference signal in an FDR system.

In FIG. 22, it is assumed that a UE has two transmission antennas and two reception antennas. In addition, it is assumed that the antennas are arranged according to the antenna deployment described in FIG. 19, FIG. 20, or FIG. 21.

In the above-mentioned situation, based on the FDR scheme, the UE transmits a first signal through a first resource region using a first transmission antenna. Moreover, the UE transmits a second signal through a second resource region using a second transmission antenna [S2210].

The UE may receive a desired signal through the first resource region using the first reception antenna and also receive another desired signal through the second resource region using the second reception antenna. At this time, interference signals may also be received by the first and second reception antennas through the first and second resource regions, respectively [S2220].

Although the procedure from the step S2210 to the step S2220 are divided into different steps, when a resource region is configured with the same time and frequency, the different steps may be simultaneously performed.

Further, after receiving the interference signals through the first and second reception antennas, the UE may perform channel estimation with respect to interference channels [S2230].

In this case, if the antenna deployment described in FIG. 20 and an ideal communication environment where there is no interference are assumed, the step S2230 can be omitted.

Thereafter, as mentioned in Equation 5, the UE may detect the desired signals by cancelling the interference signals from the received signal in consideration of the estimated interference channels [S2240].

Although FIG. 22 illustrates a case in which the proposed method is applied to a UE, the method can be identically applied to an eNB. In addition, although FIG. 22 assumes that respective transmission antennas use different resource regions, the respective transmission antennas may transmit signals through the same resource region. Moreover, reception antennas may also receive interference signals and desired signals through the same resource region.

4. Apparatuses

Apparatuses illustrated in FIG. 23 are means that can implement the methods described before with reference to FIGS. 1 to 22.

A UE may act as a transmitter on a UL and as a receiver on a DL. A BS may act as a receiver on a UL and as a transmitter on a DL.

That is, each of the UE and the BS may include a Transmitter (Tx) 2340 or 2350 and Receiver (Rx) 2360 or 2370, for controlling transmission and reception of information, data, and/or messages, and an antenna 2300 or 2310 for transmitting and receiving information, data, and/or messages.

Each of the UE and the BS may further include a processor 2320 or 2330 for implementing the afore-described embodiments of the present invention and a memory 2380 or 2390 for temporarily or permanently storing operations of the processor 2320 or 2330.

The embodiments of the present invention can be implemented based on the above-described components and functions of the UE and the BS. For example, the processor of the BS may allocate a PBCH and transmit B1 to B4 based on a transmission pattern or transmission locations by combining the methods disclosed in sections 1 to 3. The UE receives PBCH signals during TTI in which the PBCH is transmitted. Thereafter, the UE may obtain MIB contained in the received broadcast signals based on the transmission locations or the transmission pattern of the received broadcast signals. Such operations may be performed based on the methods described in FIG. 9 to FIG. 13.

The Tx and Rx of the UE and the BS may perform a packet modulation/demodulation function for data transmission, a high-speed packet channel coding function, OFDMA packet scheduling, TDD packet scheduling, and/or channelization. Each of the UE and the BS of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2380 or 2390 and executed by the processor 2340 or 2330. The memory is located at the interior or exterior of the processor and may transmit and receive data to and from the processor via various known means.

Those skilled in the art will appreciate that the present invention may be carried out in other specific ways than those set forth herein without departing from the technical features and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A transmitter for cancelling self-interference in a wireless access system supporting a full duplex radio (FDR) scheme, the transmitter comprising:
   n transmission antennas;
   n delays and attenuators; and
   m reception antennas,
   wherein n and m are natural numbers greater than 1,
   wherein the n transmission antennas and the m reception antennas are arranged apart from each other by a constant distance,
   wherein the n transmission antennas are arranged adjacent to each other,
   wherein the m reception antennas are arranged adjacent to each other,
   wherein when n signals respectively transmitted from the n transmission antennas are received by one of the m reception antennas, the n delays and attenuators connected to the n transmission antennas control the n signals received by the one of the m reception antennas to have the same channel characteristics, and
   wherein a digital pre-equalizer configured by using at least one of the n delays and attenuators is used for converting a baseband signal.

2. The transmitter of claim 1, wherein the n delays and attenuators apply at least one of time delay or power attenuation to each of the n signals transmitted from the n transmission antennas in consideration of an arrangement order of the n transmission antennas.

3. The transmitter of claim 1, further comprising m delays and attenuators,
   wherein the m delays and attenuators connected to the m reception antennas apply at least one of time delay or power attenuation to signals received by the m reception antennas.

4. The transmitter of claim 1, wherein n and m are the same.

* * * * *